(12) United States Patent
Youn et al.

(10) Patent No.: US 8,553,633 B2
(45) Date of Patent: Oct. 8, 2013

(54) BANDWIDTH REQUEST METHOD AND BANDWIDTH ALLOCATION METHOD IN BROADBAND WIRELESS ACCESS SYSTEM

(75) Inventors: Ae Ran Youn, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 317 days.

(21) Appl. No.: 13/056,404

(22) PCT Filed: Jul. 31, 2009

(86) PCT No.: PCT/KR2009/004296
§ 371 (c)(1),
(2), (4) Date: Jan. 28, 2011

(87) PCT Pub. No.: WO2010/013976
PCT Pub. Date: Feb. 4, 2010

(65) Prior Publication Data
US 2011/0149897 A1    Jun. 23, 2011

Related U.S. Application Data

(60) Provisional application No. 61/085,000, filed on Jul. 31, 2008.

(51) Int. Cl.
*H04W 4/00* (2009.01)
(52) U.S. Cl.
USPC ........................................................ 370/329
(58) Field of Classification Search
None
See application file for complete search history.

(56) References Cited

U.S. PATENT DOCUMENTS

| | | | |
|---|---|---|---|
| 7,912,425 B2 | 3/2011 | Ihm et al. | |
| 8,139,526 B2 | 3/2012 | Zhou et al. | |
| 2003/0123413 A1 | 7/2003 | Moon et al. | |
| 2004/0174845 A1* | 9/2004 | Koo et al. | 370/328 |
| 2005/0063330 A1 | 3/2005 | Lee et al. | |
| 2006/0146863 A1* | 7/2006 | Spinar et al. | 370/449 |
| 2007/0121498 A1 | 5/2007 | Park et al. | |
| 2007/0291719 A1* | 12/2007 | Demirhan et al. | 370/338 |
| 2008/0130611 A1* | 6/2008 | Branlund et al. | 370/342 |
| 2010/0202373 A1* | 8/2010 | Chun et al. | 370/329 |

FOREIGN PATENT DOCUMENTS

| | | |
|---|---|---|
| CN | 101166366 A | 4/2008 |
| CN | 101233719 A | 7/2008 |
| KR | 10-0307758 B1 | 9/2001 |
| KR | 10-2008-0068993 A | 7/2008 |
| WO | WO 00/72626 A1 | 11/2000 |

* cited by examiner

*Primary Examiner* — Otis L Thompson, Jr.
(74) *Attorney, Agent, or Firm* — Birch, Stewart, Kolasch & Birch, LLP

(57) ABSTRACT

The present invention deals with a method for requesting and allocating an uplink resource efficiently in a broadband wireless access system. The method of the present invention wherein a terminal requests bandwidth in a broadband wireless access system may include a step in which a bandwidth request header (BR header), including a bandwidth request message and a high-speed access message, is transmitted to a base station; a step in which uplink grant (UL grant) information corresponding to the information included in said bandwidth request message and said high-speed access message is received from said base station; and a step in which the uplink resource indicated by said uplink grant information is used to transmit data to said base station.

5 Claims, 8 Drawing Sheets

BANDWIDTH REQUEST METHOD AND BANDWIDTH ALLOCATION METHOD IN BROADBAND WIRELESS ACCESS SYSTEM

CROSS REFERENCE TO RELATED APPLICATIONS

This application is a National Stage of PCT International Application No. PCT/KR2009/004296 filed on Jul. 31, 2009, which claims priority under 35 U.S.C. 119(e) to U.S. Provisional Application No. 61/085,000 filed on Jul. 31, 2008. The entire contents of all of the above applications are hereby incorporated by reference into the present application.

BACKGROUND OF THE INVENTION

1. Field of the Invention

The present invention relates to a wireless access system and, more particularly, to a method of a mobile station for efficiently requesting a bandwidth to a base station and a mobile station performing the same.

2. Discussion of the Related Art

Hereinafter, a protocol layer model being defined in a general broadband wireless access system will first be described.

FIG. 1 illustrates a protocol layer model defined in a generally used IEEE 802.16 system based wireless mobile telecommunications system.

Referring to FIG. 1, a MAC layer belonging to a link layer may consist of 3 sublayers. First of all, a Service-Specific CS (Service-Specific Convergence Sublayer) may modify or map data of an external network received through a CS SAP (Service Access Point) to MAC SDUs (Service Data Units) of a MAC CPS (Common Part Sublayer). A function of associating a respective MAC SFID (Service Flow IDentifier) and a CID (Connection IDentifier), after identifying the SDUs of the external network, may be included in this layer.

Subsequently, as a layer providing the essential functions of the MAC, such as system access, bandwidth allocation, connection set-up and management, the MAC CPS receives data from various CSs through the MAC SAP, wherein the received data are classified by a specific MAC connection. At this point, a QoS (Quality of Service) may be applied to data transmission and scheduling through a physical layer.

Furthermore, a Security Sublayer may provide Authentication, security key exchange, and encryption functions.

As a connection-oriented service, the MAC layer is realized by the concept of transport connection. When a mobile station (or terminal) is registered to the system, a Service Flow may be regulated in accordance with an agreement between the mobile station and the system. If a service request is changed, a new connection may be set-up. Herein, the transport (or transmission) connection defines a mapping between peer convergence processors using MAC and the service flow. And, the service flow defines QoS parameters of the MAC PDU, which are exchanged in the corresponding connection.

The service flow within the transport connection performs an essential role in operating a MAC protocol and provides a mechanism for QoS management of an uplink and a downlink.

In a general IEEE 802.16 system, the mobile station (or terminal) may have a universal MAC address having the length of 48 bits for each wireless interface. This address uniquely defines the wireless interface of the mobile station, and this address may be used for setting up the connection of the mobile station during an initial ranging procedure. Additionally, since the base station verifies each of the mobile stations with a different mobile station identifier (ID), the universal MAC address may be used as part of the authentication process.

Each connection may be identified by a CID (Connection IDentifier) having the length of 16 bits. While the initialization of the mobile station is under process, two pairs (uplink and downlink) of management connection may be set up between the mobile station and the base station, and, including a management connection, a total of 3 pairs may be optionally (or selectively) used.

Within the above-described layer structure, the transmitting end and the receiving end may exchange data or control messages through a MAC PDU (Medium Access Control Packet Data Unit). In order to generate such a MAC PDU, the base station or the mobile station may include a MAC header in the MAC PDU.

The mobile station may request for an uplink bandwidth by transmitting bandwidth request information in a MAC signaling header format or a MAC sub-header format. At this point, the mobile station requests for an uplink bandwidth in connection units between the mobile station and the base station. Hereinafter a general header structure will be described in detail.

FIG. 2 illustrates an exemplary MAC header format being used in an IEEE 802.16 system based wireless MAN mobile telecommunications system. Hereinafter, in the description of the present invention, in a block showing the header structure including FIG. 2, one graduation of indicates 1 bit, and one horizontal row indicates 1 byte. And, it is shown in FIG. 2 that, from top to bottom, the most significant bit (MSB) and the least significant bit (LSB) are sequentially arranged within the structure.

Referring to FIG. 2, in addition to a generic (or general) MAC header (GMH), 6 sub-headers may be used in the MAC PDU. A sub-header for each MAC PDU is inserted after the generic MAC header. Hereinafter, each field being included in the MAC header will be described in detail.

An HT (Header Type) field corresponds to a field indicating the header type. Herein, the HT field indicates whether the corresponding MAC PDU is a generic MAC header including a payload after the header or whether the corresponding MAC PDU is a signaling header for controlling a BR (Bandwidth Request). An EC (Encryption Control) field corresponds to a field indicating encryption control. Herein the EC header indicates whether or not the payload is encrypted. A Type field corresponds to a field indicating whether or not a sub-header comes after the header and also indicating the type of the sub-header. An ESF (Extended Subheader Field) field indicates whether or not an extension sub-header comes after the header.

Also, a CI (CRC Indication) field indicates whether or not a CRC comes after a payload. When a payload is encrypted, an EKS (Encryption Key Sequence) field indicates an encryption key sequence number being used for the encryption. A LEN (LENgth) field indicates the length of the MAC PDU. And, a CID (Connection Identifier) field indicates a connection identifier being delivered by the MAC PDU. Herein, the CID performs the function of identifying a specific mobile station or performs the function of identifying a specific service between the base station and the mobile station. And, an HCS (Header Check Sequence) is used for detecting an error of the header. In FIG. 2, the numbers shown in parentheses after the names of each field respectively indicate the number of bits occupied by each field.

FIG. 3 illustrates a MAC signaling header type 1 being used in a wireless MAN mobile telecommunications system, which is based on a generally used IEEE 802.16 system.

Referring to FIG. 3, since the Signaling header Type 1 corresponds to a signaling header, the value of the header type (HT) field is set to '1', and the value of the encryption control (EC) field is set to '0'. The description of the type field is as shown in Table 1 below.

TABLE 1

| Type Field (3 bits) | MAC Header type (with HT/EC = 0b10) |
|---|---|
| 000 | BR incremental |
| 001 | BR aggregate |
| 010 | PHY channel report |
| 011 | BR with UL Tx power report |
| 100 | BR and CINR report |
| 101 | BR with UL sleep control |
| 110 | SN report |
| 111 | CQICH allocation repuest |

As shown in Table 1, depending upon the value to the type field, the Header Content field may have a different format. For example, when the type field has the value of "000" or "001", the MAC signaling header is used as the BR (Bandwidth Request) header. The header format of this case will be described with reference to FIG. 4.

FIG. 4 illustrates an exemplary bandwidth request header being transmitted to a base station, when a mobile station requests for a bandwidth in the IEEE 802.16 system.

A detailed description on the fields included in the bandwidth request header shown in FIG. 4 is shown in Table 2 below.

TABLE 2

| Name | Length (bit) | Description |
|---|---|---|
| BR | 19 | Indicates the size of an uplink bandwidth requested by the mobile station for the corresponding CID in byte units. The request is not influenced by a modulation or encoding of a physical layer. |
| CID | 16 | Connection Identifier |
| EC | 1 | Set to 0 in the signaling header. |
| HCS | 8 | Header check sequence |
| HT | 1 | Set to 1, being the signaling header. |
| Type | 3 | Indicates the type of the Bandwidth Request header. |

When requesting an uplink bandwidth by using the header as shown in FIG. 4, the mobile station may request for up to a maximum of 512 KB.

In a general system, e.g., in a system following the IEEE 802.16e standard, a bandwidth can be requested by using the above-described header. However, in the newly developed (or latest) system, e.g., in a wireless telecommunications system following the IEEE 802.16m standard (WirelssMAN-OFDMA advanced system only or WirelessMAN-OFDMA Reference System/WirelessMAN-OFDMA Advanced co-existing System), a more advanced and efficient method for requesting a bandwidth, as compared to the method used in the general system, is required to be defined.

SUMMARY OF THE INVENTION

Accordingly, the present invention is directed to provide an efficient method of a mobile station for requesting a bandwidth that substantially obviates one or more of the above-described general problems due to limitations and disadvantages of the related art.

An object of the present invention is to provide a quick method of a mobile station for requesting a bandwidth that does not require a process of the mobile station requesting a base station for an uplink resource for transmitting a bandwidth request message.

Another object of the present invention is to provide an efficient method for requesting a bandwidth, wherein the base station provides different bandwidth request channels to the mobile station for each mobile station group, the mobile station groups being categorized by a predetermined categorization standard.

Additional objects and features of the present application will be set forth in part in the description which follows and in part will become apparent to those having ordinary skill in the art upon examination of the following or may be learned from practice of the present application.

To achieve these objects and other advantages and in accordance with the purpose of the invention, as embodied and broadly described herein, according to an embodiment of the present invention, in a method of a mobile station for requesting a bandwidth in a broadband wireless access system, the method for requesting a bandwidth includes the steps of transmitting a bandwidth request header (BR header) including a bandwidth request message and a quick access message to a base station; receiving uplink grant (UL grant) information corresponding to information included in the bandwidth request message and the quick access message to the base station; and transmitting data to the base station by using an uplink resource indicated by the uplink grant information. Herein, the quick access message may include at least one of a mobile station identifier for identifying (or addressing) the mobile station, an identifier for identifying quality of service (QoS), priority information, size information on a size of the requested bandwidth, information on a buffer size of the mobile station, and information on an uplink transmission power (UL Tx power).

At this point, the method for requesting a bandwidth may further include the step of receiving allocation information of a bandwidth request channel corresponding to an uplink resource for transmitting the bandwidth request header from the base station through a predetermined broadcast channel. Herein, the step of transmitting a bandwidth request header (BR header) may correspond to a step of transmitting the bandwidth request header through the bandwidth request channel.

Also, the step of transmitting a bandwidth request header (BR header) may be performed by using a contention-based method.

Also, it is preferable that the predetermined broadcast channel corresponds to a secondary super-frame header (S-SFH).

Also, the bandwidth request channel may be allocated for each of at least one or more groups, the groups being categorized based upon a predetermined standard.

Also, the predetermined standard may be determined by taking into consideration at least one of priority level, service type, and mobile station identifier.

Also, the at least one or more groups may be allocated through any one of a SubscriberStation Basic Capability (SBC) procedure or a Dynamic Service Addition (DSA) procedure.

Also, the at least one or more groups may be allocated through any one of a broadcast station identifier (broadcast STID) and a multicast station identifier (multicast STID).

Furthermore, the priority information may include at least one of an emergency transmission status, a level according to a capability of the mobile station, and a user level of the mobile station determined a telecommunications service provider.

To achieve these objects and other advantages and in accordance with the purpose of the invention, as embodied and broadly described herein, according to another embodiment of the present invention, in a method of a base station allocating a bandwidth to a mobile station in a broadband wireless access system, the method for allocating a bandwidth includes the steps of receiving a bandwidth request header (BR header) including a bandwidth request message and a quick access message from the mobile station; transmitting uplink grant (UL grant) information corresponding to information included in the bandwidth request message and the quick access message to the mobile station; and receiving data from the mobile station through an uplink resource indicated by the uplink grant information. Herein, the quick access message may include at least one of a mobile station identifier for identifying (or addressing) the mobile station, an identifier for identifying quality of service (QoS), priority information, size information on a size of the requested bandwidth, information on a buffer size of the mobile station, and information on an uplink transmission power (UL Tx power).

At this point, it is preferable that the method for allocating a bandwidth further includes the step of broadcasting allocation information of a bandwidth request channel corresponding to an uplink resource for receiving the bandwidth request header through a predetermined broadcast channel. Herein, the step of receiving a bandwidth request header (BR header) may correspond to a step of receiving the bandwidth request header through the bandwidth request channel.

Also, the step of receiving a bandwidth request header (BR header) may be performed by using a contention-based method.

Furthermore, it is preferable that the predetermined broadcast channel corresponds to a secondary super-frame header (S-SFH).

To achieve these objects and other advantages and in accordance with the purpose of the invention, as embodied and broadly described herein, according to yet another embodiment of the present invention, in a mobile station, the mobile station includes a processor; a receiving module; a transmitting module; and an antenna configured to transmit radio signals received from an external source to the receiving module and to transmit radio signals being delivered from the transmitting module to an external source.

Herein, the receiving module may perform demodulating and decoding on the wireless signals being delivered from the antenna, the transmitting module may perform modulating and encoding on the data being delivered from the processor, and the processor may control the transmitting module so that the transmitting module can generate a bandwidth request header (BR header) including a bandwidth request message and a quick access message corresponding to a size of data that are to be transmitted to a base station, and so that the transmitting module can transmit the generated bandwidth request header to the base station, and the process may control the transmitting module so that, when uplink grant (UL grant) information corresponding to information included in the bandwidth request message and the quick access message to are delivered from the receiving module, the transmitting module can use an uplink resource indicated by the uplink grant information so as to transmit the data to the base station.

At this point, the quick access message includes at least one of a mobile station identifier for identifying (or addressing) the mobile station, an identifier for identifying quality of service (QoS), priority information, size information on a size of the requested bandwidth, information on a buffer size of the mobile station, and information on an uplink transmission power (UL Tx power).

Furthermore, the controller may control the receiving module so that allocation information of a bandwidth request channel corresponding to an uplink resource for receiving the bandwidth request header can be received from the base station through a predetermined broadcast channel, and the controller may control the transmitting module so that the bandwidth request header can be transmitted through the bandwidth request channel.

According to the embodiments of the present invention, the present invention has the following advantages.

First of all, according to the present invention, the mobile station may more efficiently request for a bandwidth to the base station.

Secondly, according to the present invention, without performing a process of requesting the base station for an uplink resource for transmitting a bandwidth request message, the mobile station may use the uplink resource periodically allocated (or assigned) thereto so as to transmit the bandwidth request message to the base station.

Thirdly, according to the present invention, since the base station allocates (or assigns) different bandwidth request channels to the mobile station for each mobile station group, wherein the mobile station groups is categorized by a predetermined categorization standard, the mobile station may be capable of efficiently performing a contention base bandwidth request.

Finally, according to the procedure defined in the present invention, in a system of a newly developed standard, the mobile station may transmit supplementary information (Quick Access message) to the base station, thereby efficiently performing the bandwidth request.

Additional advantages of the present application will be set forth in part in the description which follows and in part will become apparent to those having ordinary skill in the art upon examination of the following or may be learned from practice of the present application.

DETAILED DESCRIPTION OF THE INVENTION

Figure 1:
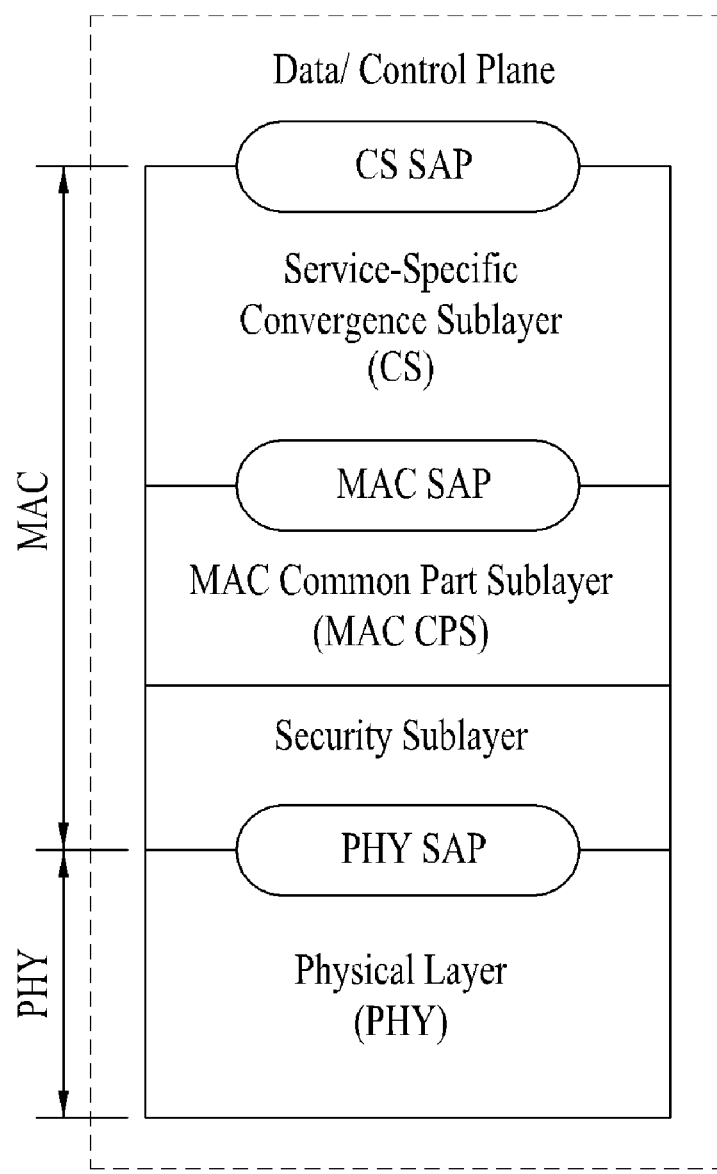
FIG. 1 illustrates a layer structure of a general IEEE 802.16 system.
Figure 2:
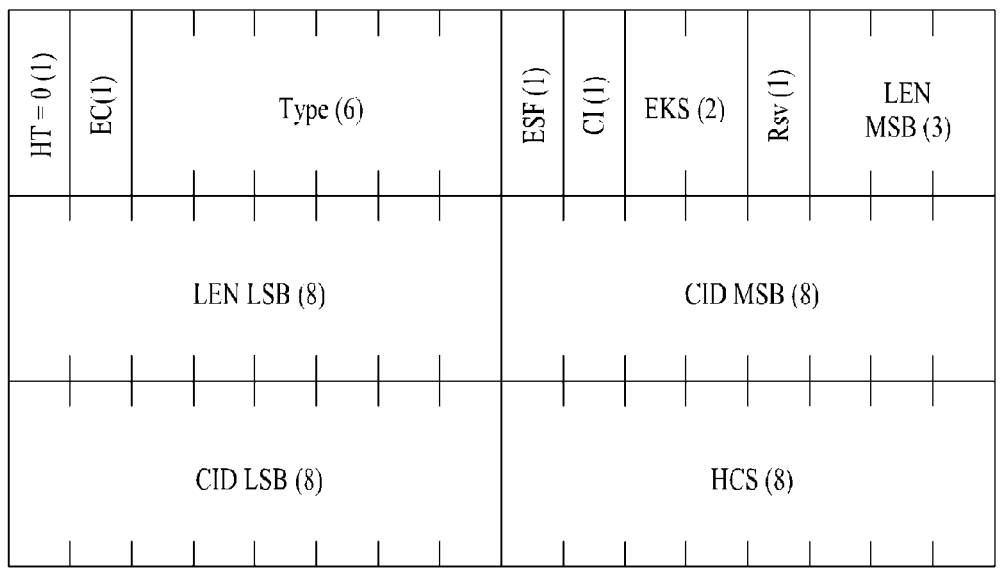
FIG. 2 illustrates an exemplary MAC header format being used in an IEEE 802.16 system based wireless MAN mobile telecommunications system.
Figure 3:
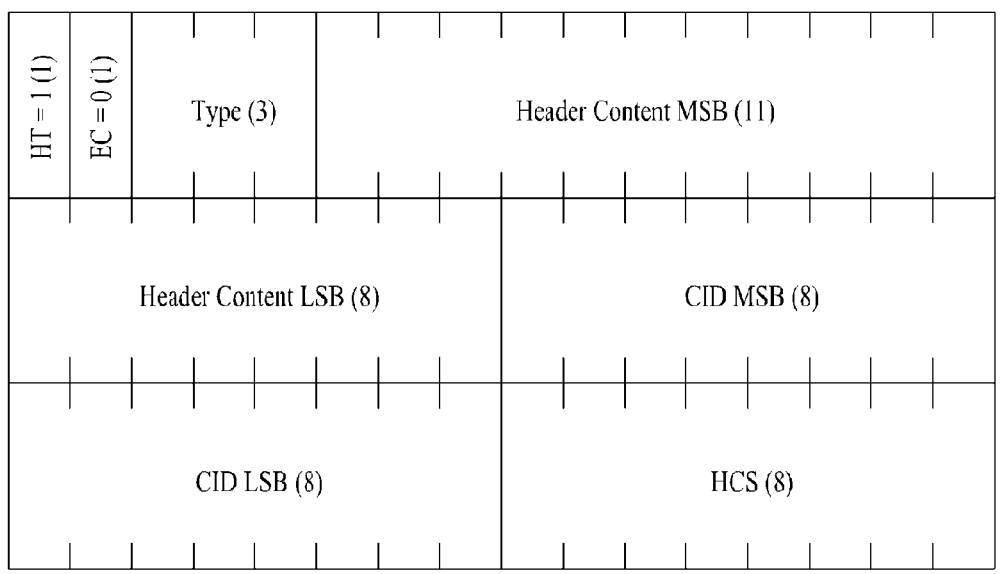
FIG. 3 illustrates a MAC signaling header type 1 being used in a wireless MAN mobile telecommunications system, which is based on a generally used IEEE 802.16 system.
Figure 4:
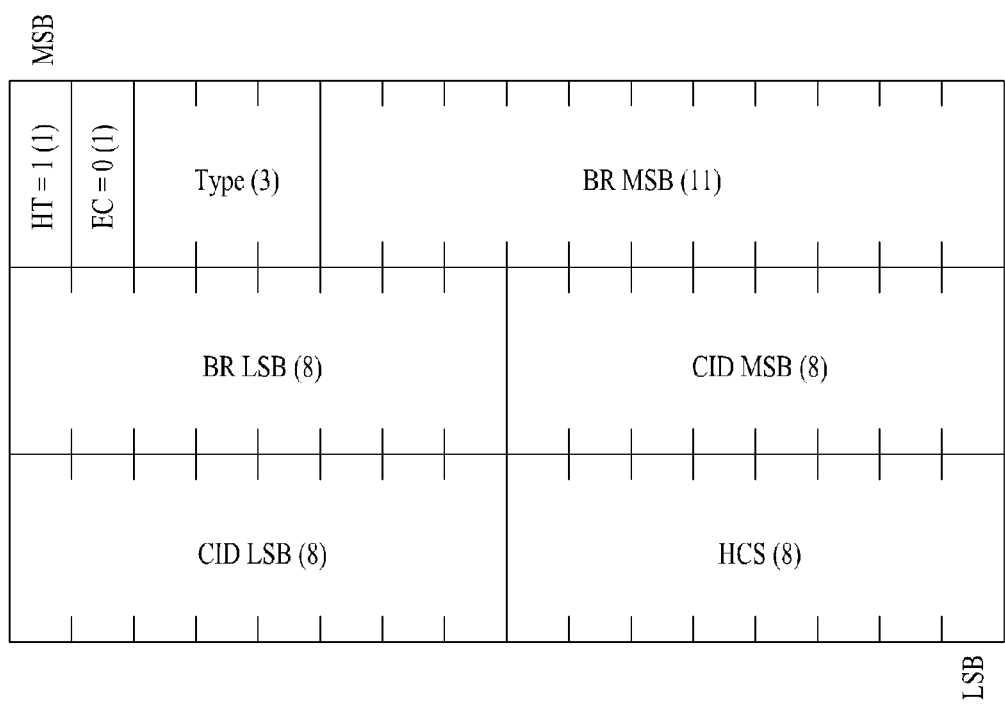
FIG. 4 illustrates an exemplary bandwidth request header being transmitted to a base station, when a mobile station requests for a bandwidth in the IEEE 802.16 system.

In order to resolve the above-described technical problems (or or to achieve the above-described technical objects), the present invention discloses various methods enabling the mobile station (or terminal) to efficiently request a bandwidth.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or mobile station). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on. Additionally, the term 'Mobile station' may be replaced by terms including UE (Mobile station), Terminal, MSS (Mobile Subscriber Station), SS (Subscriber Station), and so on.

The embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

Herein, the embodiments of the present invention may be supported by at least one the disclosed standard documents for wireless access systems including the IEEE 802 system, the 3GPP LTE system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents. Most particularly, the embodiments of the present invention may be supported by at least one of the standard documents for the IEEE 802.16 system, such as P802.16-2004, P802.16e-2005, and P802.16Rev2.

The specific terms used in the following description of the present invention are provided to facilitate the understanding of the present invention. And, therefore, without deviating from the technical scope and spirit of the present invention, such specific terms may also be varied and/or replaced by other terms.

The method for requesting a bandwidth in a broadband wireless access system is divided into a contention-based request method and a contention-free request method. The contention-based request method corresponds to a method wherein a plurality of users is in contention to request for a bandwidth in a single channel. The contention-free method corresponds to a method wherein each user sends a bandwidth request to its allocated (or assigned) channel. When using the contention-free method, the mobile station may send a bandwidth request message in a unicast method through a channel allocated by a polling of the base station. Alternatively, the mobile station may send a bandwidth request message by using a piggy back method to a remaining region of the bandwidth initially allocated (or assigned) by the base station. Hereinafter, the contention-based request method will first be described with reference to FIG. 5.

Figure 5:
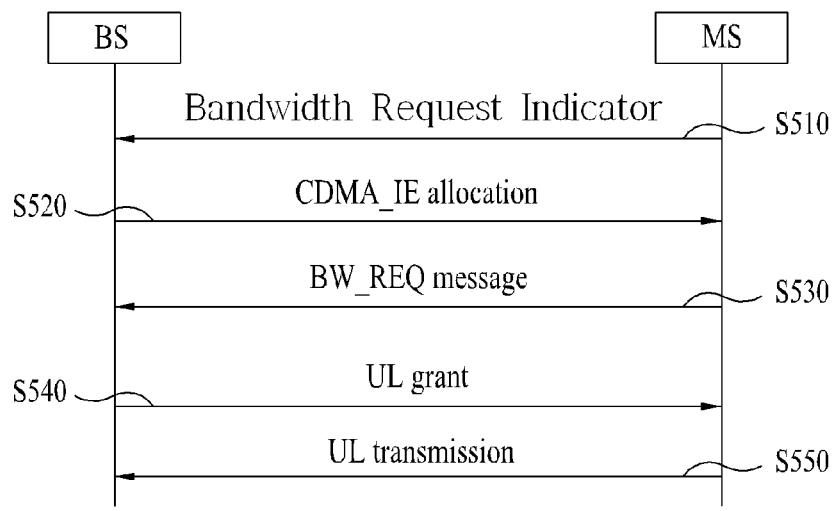
FIG. 5 illustrates a 5-step bandwidth request procedure of the mobile station using a general contention-based request method.

FIG. 5 illustrates a 5-step bandwidth request procedure of the mobile station using a general contention-based request method.

Referring to FIG. 5, when data that are to be transmitted to the base station are generated, the mobile station first transmits a Bandwidth Request Indicator to the base station (S510).

More specifically, as an example of the Bandwidth Request Indicator, among the CDMA codes for a contention-based bandwidth request (i.e., BR codes (Bandwidth Request codes)), a CDMA ranging code (sequence or ranging preamble code) may be randomly selected by the mobile station. Among the uplink resource, the mobile station may transmit the selected code to a slot, which is randomly selected from a region allocated by the base station for the Bandwidth Request in the uplink resource.

If the base station recognizes the CDMA code transmitted by the mobile station, the base station uses a CDMA allocation information element (CDMA_Allocation_IE) so as to allocate a resource to which the mobile station is to transmit a bandwidth request message (S520).

After receiving the information on the uplink resource for transmitting the bandwidth request message, the mobile station transmits the bandwidth request message to the corresponding resource region. At this point, the mobile station may use the bandwidth request header (BR header), and the header includes information on the size of the requested bandwidth and the service type (S530).

The base station may transmit a response to the bandwidth request message transmitted from the mobile station to the mobile station, and, if the bandwidth requested by the mobile station is available, the base station allocates the uplink resource corresponding to the information included in the header to the mobile station (S540).

The mobile station transmits data to the allocated uplink resource (S550). At this point, if the allocated uplink resource remains, the mobile station may additionally request for resource allocation to the base station by using the piggy back method.

Subsequently, the bandwidth request process using the contention-free request method will now be described in detail with reference to FIG. 6.

Figure 6:
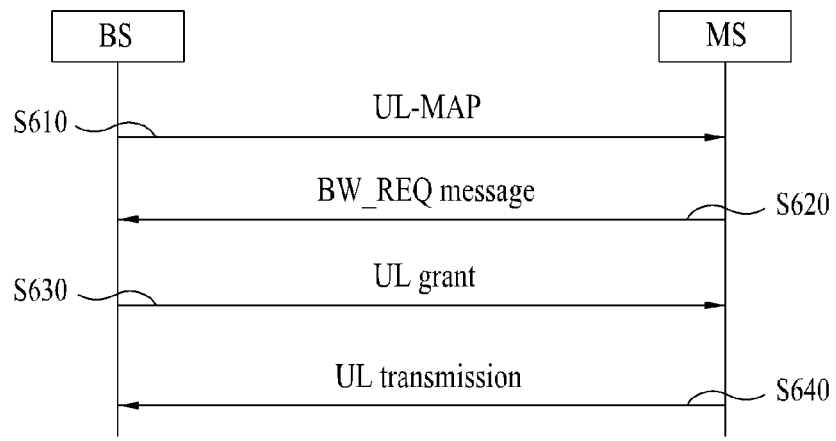
FIG. 6 illustrates an uplink resource allocation procedure of the mobile station using polling among general contention-free request methods.

FIG. 6 illustrates an uplink resource allocation procedure of the mobile station using polling among general non-contention request methods.

Referring to FIG. 6, the base station periodically allocates an uplink resource enabling the mobile station to transmit a bandwidth request message through a polling process (S610).

The mobile station uses the allocated uplink resource so as to transmit a bandwidth request message to the base station by using the contention-free request method, wherein the bandwidth request message uses a bandwidth request header (BR header) including information on the bandwidth corresponding to the size of the data that are to be transmitted by the mobile station (S620).

After receiving the corresponding bandwidth request, when the requested bandwidth is available, the base station allocates the uplink resource to the mobile station (S630).

The mobile station then transmits the corresponding data to the uplink region allocated by the base station (S640).

First Embodiment

In a system more evolved (or advanced) than the general system, e.g., in a system following the IEEE 802.16m standard, in order to enable the mobile station to request the base station for a bandwidth, information other than those of the general system may be required.

More specifically, in a bandwidth request header (BR Header) of the IEEE 802.16e system, a mobile station and a QoS (Quality of Service) may be identified by using a CID (Connection IDentifier) having the length of 16 bits. However, in an IEEE 802.16m system, a station identifier (STID) is used as a logical identifier for identifying the mobile station. And, a connection of the mobile station or the respective QoS may be identified through a flow identifier (FID).

Accordingly, an embodiment of the present invention proposes a method enabling the mobile station to efficiently transmit the above-described information to the base station, so as to request a bandwidth.

In order to do so, the present invention proposes a Quick Access message. Herein, a Quick Access message refers to a message including information that is to be transmitted by the mobile station to the base station, in an advanced system, in order to request for a bandwidth.

Such Quick Access message may include information for identifying the mobile station (AMS (Advanced Mobile Station)) (AMS addressing information (e.g., STID)), information on the size of the bandwidth that is to be requested (request size), information on an uplink transmission power (Uplink transmit power report or UL Tx power), a QoS identifier (e.g., FID), information on a buffer size of the mobile station, information on the priority level, and so on.

Herein, when a Quick Access message is transmitted to the base station, the information on the Uplink transmit power report may indicate the power level used, or may indicate the remaining power from the maximum available power level of the mobile station.

Furthermore, the information on the priority level may correspond to whether or not emergency transmission has been performed, priority levels respective to the mobile station class, or user level determined by the communications service provider.

The Quick Access message including the above-described information may be transmitted along with the bandwidth request indicator in step S510 of FIG. 5 or with the bandwidth request message in step S530 of FIG. 5.

In case the Quick Access message is transmitted along with the bandwidth request message, the Quick Access message may be transmitted to the base station through a bandwidth request header (BR header) for transmitting the bandwidth request message. In other words, each set of information included in the Quick Access message may be included in the bandwidth request header in the form of fields configuring the bandwidth request header.

Accordingly, by using the method provided in the embodiment of the present invention, the mobile station may efficiently transmit information for requesting a bandwidth to the base station in an advanced system, without having to separately perform any additional process steps.

Second Embodiment

According to another embodiment of the present invention, by having the base station allocate an uplink resource enabling the mobile station to periodically transmit a bandwidth request message, the present invention provides a method enabling the mobile station to request for an uplink resource to the base station more quickly.

In the general contention-based bandwidth request method described above with reference to FIG. 5, a delay may occur due to the procedure for being allocated with the uplink resource for transmitting the bandwidth request message, i.e., due to the process of transmitting a Bandwidth Request Indicator to the base station and the process of receiving an uplink resource information for transmitting a bandwidth request message as a response to the transmitted bandwidth request indicator (i.e., UL grant for BW REQ message). This procedure will be described in detail with reference to FIG. 7.

Figure 7:
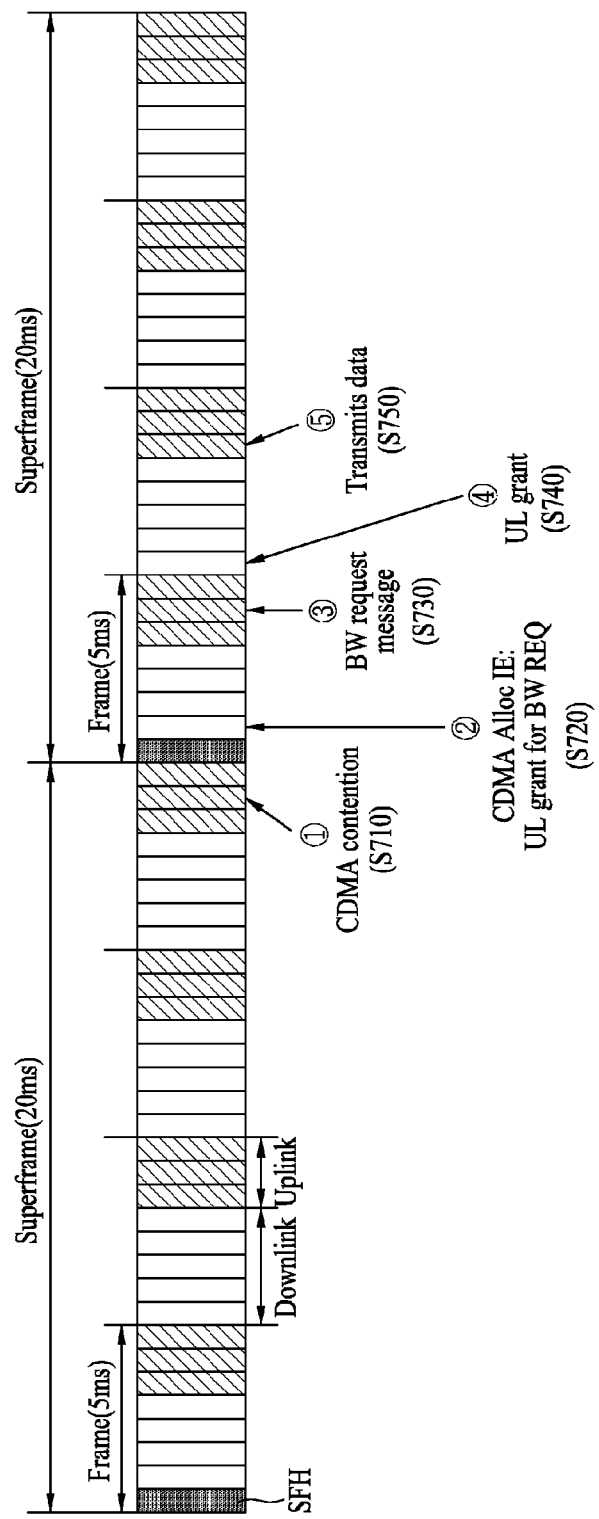
FIG. 7 illustrates a general contention-based 5-step bandwidth request procedure in a frame structure of an IEEE 802.16m system.

FIG. 7 illustrates a general contention based 5-step bandwidth request procedure in a frame structure of an IEEE 802.16m system.

In FIG. 7, a super-frame has the length of 20 ms and includes 4 frames. Herein, it is assumed that one frame includes 8 sub-frames, and, according to TDM (Time Division Multiplexing) 5 of the sub-frames are allocated as downlink sub-frames, and that the remaining 3 sub-frames are allocated as uplink sub-frames. Furthermore, since the details on each step are similar to those of FIG. 5, the detailed description of the same will be omitted for simplicity.

First of all, when data that are to be transmitted to the base station are generated, the mobile station uses one of the uplink sub-frames included in the last frame of the first super-frame to transmit a Bandwidth Request Indicator to the base station (S710).

Then, as a response to the received Bandwidth Request Indicator, the base station allocates an uplink resource for transmitting a bandwidth request message (CDMA alloc IE or UL grant for BW REQ) to the mobile station through a downlink sub-frame of the next frame (S720).

The mobile station uses the allocated uplink resource (in case of FIG. 7, the mobile station uses an uplink sub-frame included in the same frame as the frame to which the CDMA alloc IE is transmitted) so as to transmit the bandwidth request message to the base station (S730).

Thereafter, the base station allocates information on the uplink resource (UL grant), which corresponds to the information included in the bandwidth request message, to the mobile station through a downlink sub-frame of the next frame (S740).

The mobile station uses the uplink resource indicated by an uplink grant (UL grant) information (in case of FIG. 7, the mobile station uses an uplink sub-frame included in the same frame as the frame to which the UL grant is transmitted) so as to transmit data to the base station (S750).

In case of the above-described FIG. 7, while being processed over the 5 steps, by using an uplink sub-frame and a downlink sub-frame of each frame, a total of 3 frames are used herein. If the process step S710 and step S720 can be omitted, the mobile station may be able to request for a bandwidth with more efficiency. In order to do so, this embodiment of the present invention proposes a method of having the mobile station periodically allocate an uplink resource, which can transmit the bandwidth request message using a contention-based method, and also a method of transmitting information on the allocated uplink resource through a predetermined broadcast channel. This process will hereinafter be described in more detail with reference to FIG. 8.

Figure 8:
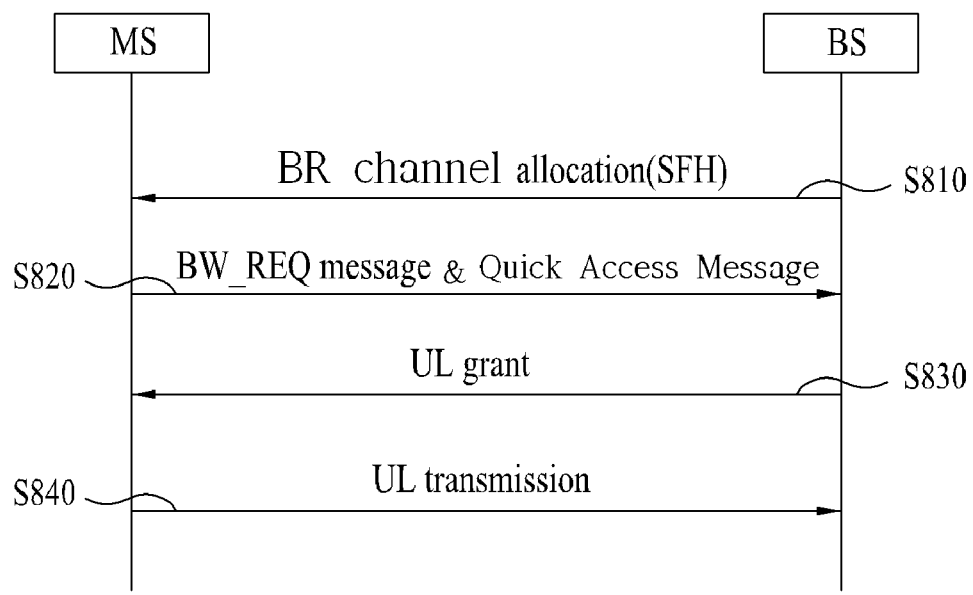
FIG. 8 illustrates a bandwidth request procedure of the mobile station using a contention-based request method according to another embodiment of the present invention.

FIG. 8 illustrates a bandwidth request procedure of the mobile station using a contention based request method according to another embodiment of the present invention.

Referring to FIG. 8, the base station (or ABS (Advanced Base Station)) may transmit information on uplink resources (hereinafter referred to as a "BR (Bandwidth Request) channel information"), which are allocated so that the mobile station (AMS) can transmit the bandwidth request message by using the contention-based method through a predetermined broadcast channel (hereinafter referred to as a "BR (Bandwidth Request) channel") to the mobile station (S810).

Herein, it is preferable that the predetermined broadcast channel is a Super Frame Header (SFH). More preferably, the predetermined broadcast channel may be a broadcast channel (BCH) of the super frame header, i.e., a secondary super frame header (S-SFH).

Furthermore, the BR channel may correspond to an uplink resource identical to that of the generally used 5-step method for requesting a bandwidth, which is described with reference to FIG. 5, or the BR channel may correspond to an uplink resource that is separately allocated to each group, which is classified (or differentiated) by mobile station type, service type, or priority level. In case the BR channel is differentiated for each group, a time-division method may be used. More specifically, a BR channel for each group may be allocated to different uplink sub-frames of each group, or a BR channel for each group may be allocated to different symbol regions.

If a group is set-up, the group may be decided by SBC (SubscriberStation Basic Capability) or DSA (Dynamic Service Addition) procedures between the mobile station and the base station, and, then, the decided group may be notified to the mobile station.

In this case, the base station may allocate any one identifier for identifying (or addressing) a group to which the mobile station belongs through the SBC procedure or the DSA procedure. Examples of the identifiers may include a broadcast connection identifier (broadcast CID), a multicast connection identifier (multicast CID), a broadcast station identifier (broadcast STID), and a multicast station identifier (multicast STID).

When data that are to be transmitted to the base station are generated, the mobile station transmits a bandwidth request message to the corresponding BR channel based upon the information acquired in step S810.

At this point, the bandwidth request message may be transmitted to the base station in a bandwidth request header (BR header) format. And, the bandwidth request message may include a preamble and additional information enabling the mobile station to request for the bandwidth to the base station, wherein the additional information may correspond to a Quick Access message.

Herein, as described in the embodiment of the present invention, in addition to the conventional preamble (i.e., ranging preamble sequence), the Quick Access message may include an identifier for identifying (or addressing) the mobile station (CID or STID), QoS level information (i.e., an identifier for identifying the QoS (SF ID or FID)), information on the priority level, information on the size of the bandwidth that is being requested (BR length), information on a buffer size of the mobile station, information on an uplink transmission power (UL Tx power or Uplink transmit power report), and so on.

Herein, when a Quick Access message is transmitted to the base station, the information on the Uplink transmit power report may indicate the power level used, or may indicate the remaining power from the maximum available power level of the mobile station.

Furthermore, the information on the priority level may correspond to whether or not emergency transmission has been performed, priority levels respective to the mobile station class, or user level determined by the communications service provider.

After receiving the bandwidth request message including the above-described information, the base station may transmit a response signal respective to the received bandwidth request message to the mobile station. Based upon the information included in the bandwidth request message, the base station allocates an uplink resource to the mobile station through an uplink grant (UL grant) information (S830).

The mobile station may transmit data to the base station through the uplink resource indicated by the uplink grant (UL grant), and, if any, remaining resource may be requested for additional allocation in a piggyback format (S840).

Hereinafter, a delay that may occur when using the above-described method for requesting a bandwidth will now be described in detail with reference to FIG. 9.

Figure 9:
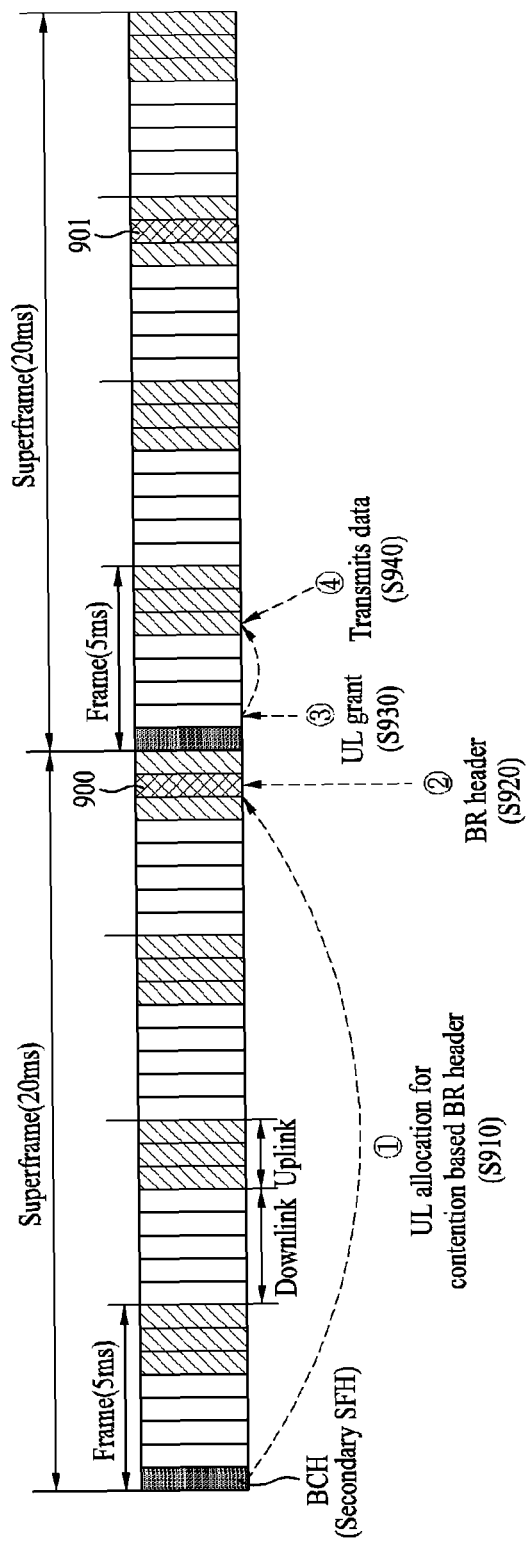
FIG. 9 illustrates a bandwidth request procedure of the mobile station using a contention-based request method in a frame structure of an IEEE 802.16m system according to another embodiment of the present invention.

FIG. 9 illustrates a bandwidth request procedure of the mobile station using a contention based request method in a frame structure of an IEEE 802.16m system according to another embodiment of the present invention.

In FIG. 9, a super-frame has the length of 20 ms and includes 4 frames. Herein, it is assumed that one frame includes 8 sub-frames, and, according to TDM (Time Division Multiplexing) 5 of the sub-frames are allocated as downlink sub-frames, and that the remaining 3 sub-frames are allocated as uplink sub-frames. Furthermore, since the details on each step are similar to those of FIG. 8, the detailed description of the same will be omitted for simplicity.

First of all, BR channel information is included in a broadcast channel (BCH or S-SFH) of the first super-frame, and the BR channel information designates a second uplink sub-frame 900 of the last frame within the same sub-frame as the BR channel (S910).

In case data that are to be transmitted to the base station exist, the mobile station transmits a bandwidth request message to the BR channel 900 by using a contention-based method (S920). At this point, the above-described quick access message may be included in the bandwidth request message.

The base station uses the information included in the bandwidth request message transmitted from the mobile station, so as to transmit downlink sub-frame of a next frame to the mobile station and uplink grant (UL grant) information, thereby allocating a bandwidth (S930).

The mobile station may transmit data to the base station by using the uplink resource indicated by the UL grant information and, then, may use the remaining resource so as to request the base station for additional allocation in a piggyback format (S940).

If data that are to be transmitted to the mobile station generates from the second super-frame, the mobile station may request the base station for a bandwidth by using the BR channel 901, which is designated by the BR channel information included in the super-frame header of the second super-frame (S940).

Referring to FIG. 9, the above-described method for requesting a bandwidth may transmit data from a BR channel within a delay corresponding to one frame. This indicates that the method for requesting a bandwidth provided by the present invention is advantageous in showing a large decrease in delay as compared to the delay corresponding to 3 frames, as shown in FIG. 7.

According to yet another embodiment of the present invention, a mobile station and base station that can perform the above-described embodiments of the present invention will now be described in detail.

The mobile station may operate as a transmitter in an uplink, and the mobile station may operate as a receiver in a downlink. Also, the base station may operate as a receiver in an uplink, and the base station may operate as a transmitter in a downlink. More specifically, the mobile station and the base station may each include a transmitter and a receiver for transmitting information or data to and from one another.

The transmitter and receiver may each include a processor, a module, a part, and/or a medium. Most particularly, the transmitter and receiver may each include a module (medium) for encrypting a message, a module for interpreting an encrypted message, an antenna for transmitting and receiving messages, and so on. An example of such transmitting end and receiving end will now be described in detail with reference to FIG. 9.

Figure 10:
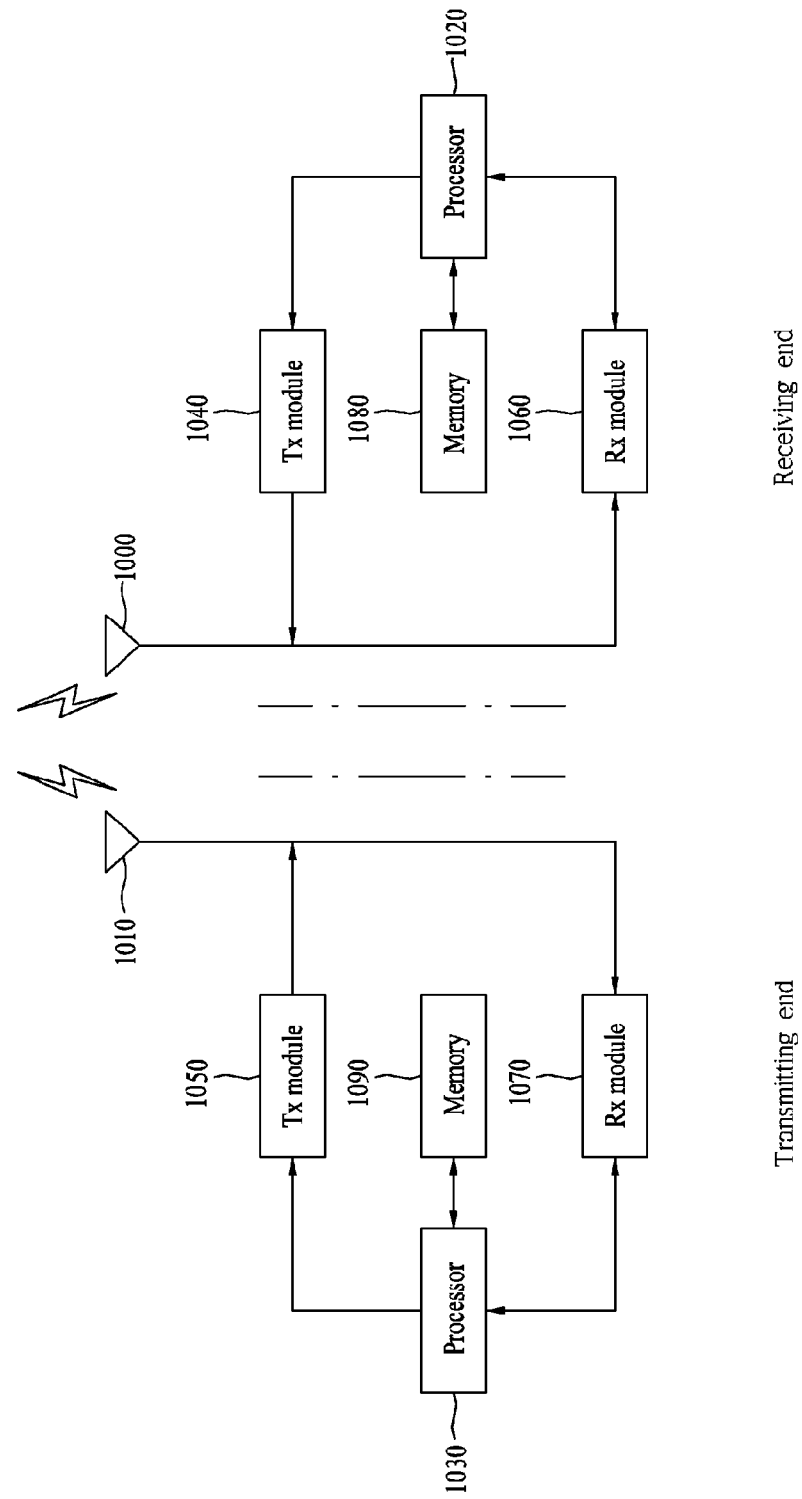
FIG. 10 illustrates a block view showing structures of a transmitting end and a receiving end according to another embodiment of the present invention.

FIG. 10 illustrates a block view showing structures of a transmitting end and a receiving end according to another embodiment of the present invention.

Referring to FIG. 10, the left side represents the structure of the transmitting end, and the right side represents the structure of the receiving end. Each of the transmitting end and the receiving end may include an antenna 1000 and 1010, a processor 1020 and 1030, a transmission module (Tx module) 1040 and 1050, a receiving module (Rx module) 1060 and 1070, and a memory 1080 and 1090. Each element may perform its corresponding function. Hereinafter, each element will now be described in detail.

The antenna 1000 and 1010 either transmits a signal created from the Tx module 1040 and 1050 to the outside, or receives a wireless signal from the outside, thereby delivering the received signal to the Rx module 1060 and 1070. When a Multiple-Input Multiple-Output (MIMO) antenna function is supported, at least 2 or more antennae may be provided herein.

The processor 1020 and 1030 generally controls the overall operations of the transmitting end or the receiving end. Most particularly, the transmitting end or the receiving end may perform a controller function for performing the above-described embodiments of the present invention, a MAC (Medium Access Control) frame variable control function based upon service characteristics and frequency environment (or condition), a hand over function, and authentication and encryption functions.

For example, in performing the process steps associated with the above-described methods for requesting a bandwidth, the processor of the mobile station may determine whether or not data that are to be transmitted to the base station exist. If it is determined that data, which are to be transmitted to the base station, exist, contents that are to be included in the bandwidth request method including a bandwidth request indicator, a quick access message, and information corresponding to the data that are to be transmitted may be decided and generated. Also, the process of the mobile station may also control the transmitting module 1050 so that the generated indicator or message can be transmitted to the base station at an appropriate moment. Furthermore, the processor 1030 may control the receiving module 1070 so as to interpret the contents included in the MAC message, such as uplink grant (UL grant) information being transmitted from the base station, thereby determining and performing an appropriate responsive operation with respect to the interpreted content.

Additionally, the processor of the base station may interpret the bandwidth request message, MAC message, or data that are transmitted to the base station from the mobile station, so as to allocate the required uplink resource to the mobile station, and the processor of the base station may also generate an uplink grant (UL grant) for notifying the mobile station of the allocation details and perform scheduling in order to transmit the generated UL grant. Furthermore, the processor of the base station may allocate identifiers, such as the STID, FID, and so on, required by the mobile station and may generate a MAC message including the corresponding information, thereby transmitting the generated MAC message to the mobile station.

The Tx module 1040 and 1050 may perform predetermined coding and modulation processes on the data scheduled by the processor 1020 and 1030 and to be transmitted to the outside, thereby delivering the processed data to the antenna 1010.

The Rx module 1060 and 1070 may perform decoding and demodulation processes on a wireless signal received from the outside through the antenna 1000 and 1010, so as to recover the processed data to the original (or initial) state, thereby delivering the recovered data to the processor 1020 and 1030.

A program for processing and controlling the processor 1020 and 1030 may be stored in the memory 1080 and 1090. The memory 1080 and 1090 may also perform functions for temporarily storing input/output data (in case of the mobile station, temporarily storing an uplink grant (UL grant), system information, STID, FID, operating time, and so on, which are allocated by the base station). Furthermore, the memory 1080 and 1090 may include at least one type of storage means, such as a flash memory type, a hard disk type, a multimedia card micro type, a card-type memory (e.g., SD or XD memory), a RAM (Random Access Memory), a SRAM (Static Random Access Memory), a ROM (Read-Only Memory), an EEPROM (Electrically Erasable Programmable Read-Only Memory), a PROM (Programmable Read-Only Memory), a magnetic memory, a magnetic disk, and an optical disk.

Meanwhile, the base station may perform a controller function for performing the above-described embodiments of the present invention, an OFDMA (Orthogonal Frequency Division Multiple Access) packet scheduling, TDD (Time Division Duplex) packet scheduling, and channel multiplexing functions, MAC frame variable control function based upon service characteristics and frequency environment (or condition), a high-speed traffic real-time control function, a hand over function, authentication and encoding (or encryption) functions, packet modulation/demodulation functions for transmitting data, a high-speed channel coding function, and a real-time modem control function through at least one of the above-described modules, or the base station may further include a separate means, module, or part for performing such functions.

It will be apparent to those skilled in the art that various modifications and variations can be made in the present invention without departing from the technical and essential spirit or scope of the invention. Therefore, the detailed description of the present invention should not be interpreted as limiting in all aspects of the present invention, but should be considered as exemplary. The scope of the appended claims of the present invention shall be decided based upon rational interpretation, and all modifications within the scope of the appended claims and their equivalents will be included in the scope of the present invention.

Although the above-described method for requesting a bandwidth and a mobile station structure for the same have been described in detail based upon an example being applied to the IEEE 802.16 system, in addition to the IEEE 802.16 system, the present invention may also be applied to a wide range of mobile telecommunications systems having similar procedures for requesting a bandwidth.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

What is claimed is:

1. A method of requesting a bandwidth by a mobile station in a broadband wireless access system, the method comprising:
   receiving allocation information of bandwidth request channels corresponding to an uplink resource for transmitting a bandwidth request (BR) preamble sequence and a quick access message from a base station through a predetermined broadcast channel;
   transmitting the BR preamble sequence and the quick access message to a base station through a randomly selected one of the bandwidth request channels;
   receiving uplink (UL) grant information from the base station in response to the BR preamble sequence and the quick access message; and
   transmitting data to the base station through an uplink resource indicated by the uplink grant information,
   wherein the quick access message comprises a mobile station identifier for identifying or addressing the mobile station, and
   wherein the predetermined broadcast channel comprises a secondary super-frame header (S-SFH).

2. The method of claim 1, wherein the transmission of the BR preamble sequence is performed by using a contention-based method.

3. A method of allocating a bandwidth by a base station in a broadband wireless access system, the method comprising:
   broadcasting allocation information of bandwidth request channels corresponding to an uplink resource for receiving a bandwidth request (BR) preamble sequence and a quick access message from a mobile station through a predetermined broadcast channel;
   receiving the BR preamble sequence and the quick access message from the mobile station through a randomly selected one of the bandwidth request channels;
   transmitting uplink (UL) grant information corresponding to information included in the quick access message to the mobile station in response to the BR preamble sequence and the quick access message; and
   receiving data from the mobile station through an uplink resource indicated by the uplink grant information,
   wherein the quick access message comprises a mobile station identifier for identifying or addressing the mobile station, and
   wherein the predetermined broadcast channel corresponds to a secondary super-frame header (S-SFH).

4. A mobile station for requesting a bandwidth in a broadband wireless access system, the mobile station comprising:
   a receiving module;
   a transmitting module; and
   a processor configured to cause:
      the receiving module to receive allocation information of bandwidth request channels corresponding to an uplink resource for transmitting a bandwidth request (BR) preamble sequence and a quick access message from a base station through a predetermined broadcast channel;
      the transmitting module to transmit the BR preamble sequence and the quick access message to a base station through a randomly selected one of the bandwidth request channels;
      the receiving module to further receive uplink (UL) grant information from the base station in response to the BR preamble sequence and the quick access message; and
      the transmitting module to further transmit data to the base station through an uplink resource indicated by the UL grant information,
   wherein the quick access message comprises a mobile station identifier for identifying or addressing the mobile station, and
   wherein the predetermined broadcast channel comprises a secondary super-frame header (S-SFH).

5. A base station of allocating a bandwidth in a broadband wireless access system, the base station comprising:
   a receiving module;
   a transmitting module; and
   a processor configured to cause:
      the transmitting module to transmit broadcasting allocation information of bandwidth request channels corresponding to an uplink resource for receiving a bandwidth request (BR) preamble sequence and a quick access message from a mobile station through a predetermined broadcast channel;

the receiving module to receive the BR preamble sequence and the quick access message from the mobile station through a randomly selected one of the bandwidth request channels;

the transmitting module to further transmit uplink (UL) grant information corresponding to information included in the quick access message to the mobile station in response to the BR preamble sequence and the quick access message; and the receiving module to further receive data from the mobile station through an uplink resource indicated by the UL grant information, wherein the quick access message comprises a mobile station identifier for identifying or addressing the mobile station, and wherein the predetermined broadcast channel corresponds to a secondary super-frame header (S-SFH).

* * * * *